July 7, 1964  A. G. FOX  3,140,451
OPTICAL MASER DEVICE
Filed Oct. 25, 1960  2 Sheets—Sheet 1

INVENTOR
A. G. FOX
BY
ATTORNEY

July 7, 1964  A. G. FOX  3,140,451
OPTICAL MASER DEVICE

Filed Oct. 25, 1960  2 Sheets-Sheet 2

INVENTOR
A.G. FOX
BY
ATTORNEY

3,140,451
OPTICAL MASER DEVICE
Arthur G. Fox, Rumson, N.J., assignor to Bell Telephone Laboratories, Incorporated, New York, N.Y., a corporation of New York
Filed Oct. 25, 1960, Ser. No. 64,885
7 Claims. (Cl. 331—94.5)

This invention relates to a device for generating or amplifying electromagnetic radiation of light frequencies. More specifically, it concerns a cavity design for use in an optical maser.

Optical masers operate with radiation in the light frequency range, which extends roughly between wavelengths of from $2.10^6$ angstroms for the farthest infrared to 100 angstroms for the ultraviolet.

A typical optical or light frequency maser is disclosed in U.S. Patent 2,929,922, issued March 22, 1960, which utilizes a cavity consisting of two parallel spaced planar reflecting surfaces. The present invention proposes a cavity geometry which shows unexpected advantages over a cavity utilizing plane parallel reflectors.

The novel cavity according to this invention is essentialy a polished spherical crystal which consists of an appropriate negative temperature medium. Such a cavity design allows for inherent total reflection of light. This means that light obtained in the cavity is entrapped such that it will be continually internally reflected from various portions of the interface between the crystal and the surrounding medium. This condition occurs wherever the index of refraction of the crystal exceeds the index of refraction of the surrounding medium. Control over the ratios of the indices of refraction controls that volume of the crystal which will entrap the light obtaining therein. Whereas in theory, the light in such a cavity is considered as forever entrapped, such light will escape the cavity through diffraction and imperfections in the surface. Such imperfections may be purposely introduced at desired points on the crystal surface so as to emit the light in a concentrated beam. In order to obtain a parallel beam or to focus the beam as desired, various lens arrangements well known in the optical arts may be employed. Various other modifications will be described hereinafter.

The negative temperature medium in this cavity is a material whose atomic or molecular structure provides three energy levels. To this material a pumping energy is supplied which translates electrons to the highest energy state thereby providing an unbalance in the equilibrium state of the atom. This electron population unbalance then tends to equalize and return to equilibrium with an attendant release of energy when electrons "fall" to the lower states. There are two mechanisms whereby the overpopulation can be equalized or relaxed. The atom can decay or spontaneously emit radiation to equalize the unbalanced or overpopulated levels. This random or spontaneous emission follows no oscillation pattern and, consequently, gives rise to noise, i.e., incoherent radiation. The other mechanism whereby energy is released by the crystal is by stimulated emission whereby radiation of a selected frequency approximating the difference in energy levels of the negative temperature medium is applied to the medium stimulating the overpopulated higher level in this case the metastable intermediate level to emit radiation and return to the equilibrium condition. The emission which is stimulated occurs in the coherent oscillation pattern of the energy stimulating it, consequently, a coherent amplified radiation pattern results. If the stimulated emission or coherent emission prevails over the spontaneous emission or noise, then maser action is considered obtained.

It is apparent that the standing wave oscillations obtained by the internally entrapped radiation will assume many mode patterns. However, one mode pattern necessarily has a Q value which exceeds all the others and, hence, is preferred by the cavity. It is this wave pattern which will be sustained by the cavity such that amplification by maser action can be efficiently obtained.

The invention can, perhaps, be better understood when considered with the drawings in which.

Figure 1:
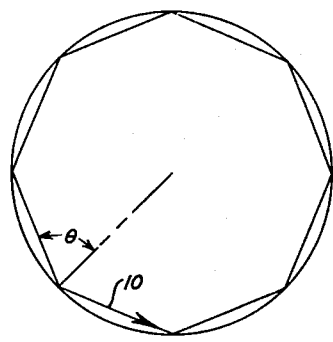
FIG. 1 is a schematic diagram showing by ray optics the phenomenon of total internal reflection of a typical ray inside the spherical cavity of this invention.

In FIG. 1, ray 10 is shown being reflected by a series of reflections around the periphery of a circumferential path of the sphere. Elementary optical theory dictates that as long as $\theta$, the angle of incidence, is greater than the critical angle, the ray will be reflected rather than transmitted. The geometry of the sphere requires that a ray, once reflected, will always be subsequently reflected. Accordingly, it is easy to see that all light meeting the interface between the cavity and the surrounding medium at an incident angle greater than the critical angle will be entrapped.

Figure 2:
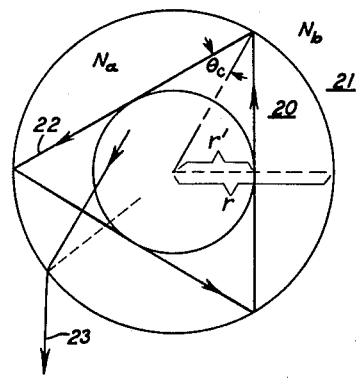
FIG. 2 is a diagram similar to that of FIG. 1 showing a different reflection pattern and correlating the angle of incidence of reflected or entrapped rays to the relative refractive indices of the crystal and the surrounding medium.

FIG. 2 shows a crystal 20 having an index of refraction equal to $N_a$ surrounded by medium 21 having index of refraction $N_b$. Ray 22, which is assumed to be at the critical angle, is reflected. However, ray 23, which is incident on the interface at an angle less than the critical angle, loses a large fraction of its energy from the cavity. Thus, an outer shell portion of the sphere is defined within which all reflecting modes must originate. All light originating in the inner spherical portion of FIG. 2 will escape from the cavity. The volume of the internal sphere is defined by radius $r'$ while the volume of the shell is determined by the total volume (dependent on $r$) minus the volume of the internal shell. The ratio of $r$ to $r'$ is fixed by the ratio of the indices of refraction as follows:

$$\frac{r'}{r} = \frac{N_b}{N_a}$$

Thus, it is seen that the volume of the sphere, and consequently, the number of modes which will be supported by the sphere can be controlled by the ratios of the indices of refraction of the cavity and the surrounding medium. As is apparent, the closer the indices of refraction are matched the smaller will be the shell portion capable of entrapping light.

Figure 3:
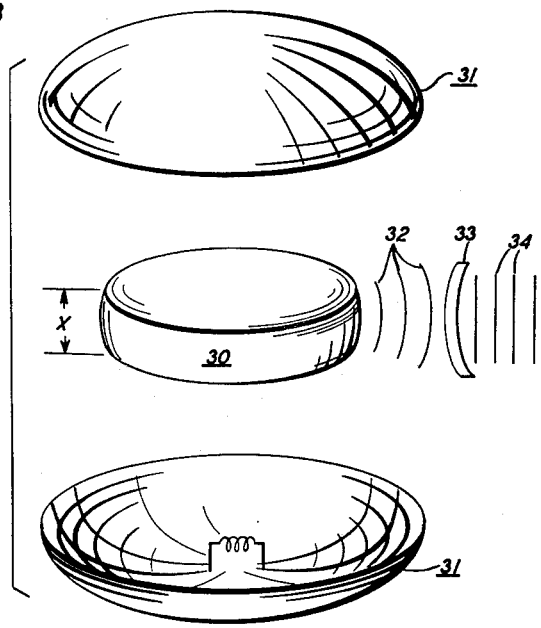
FIG. 3 is a perspective view of a preferred cavity geometry.
Figure 4:
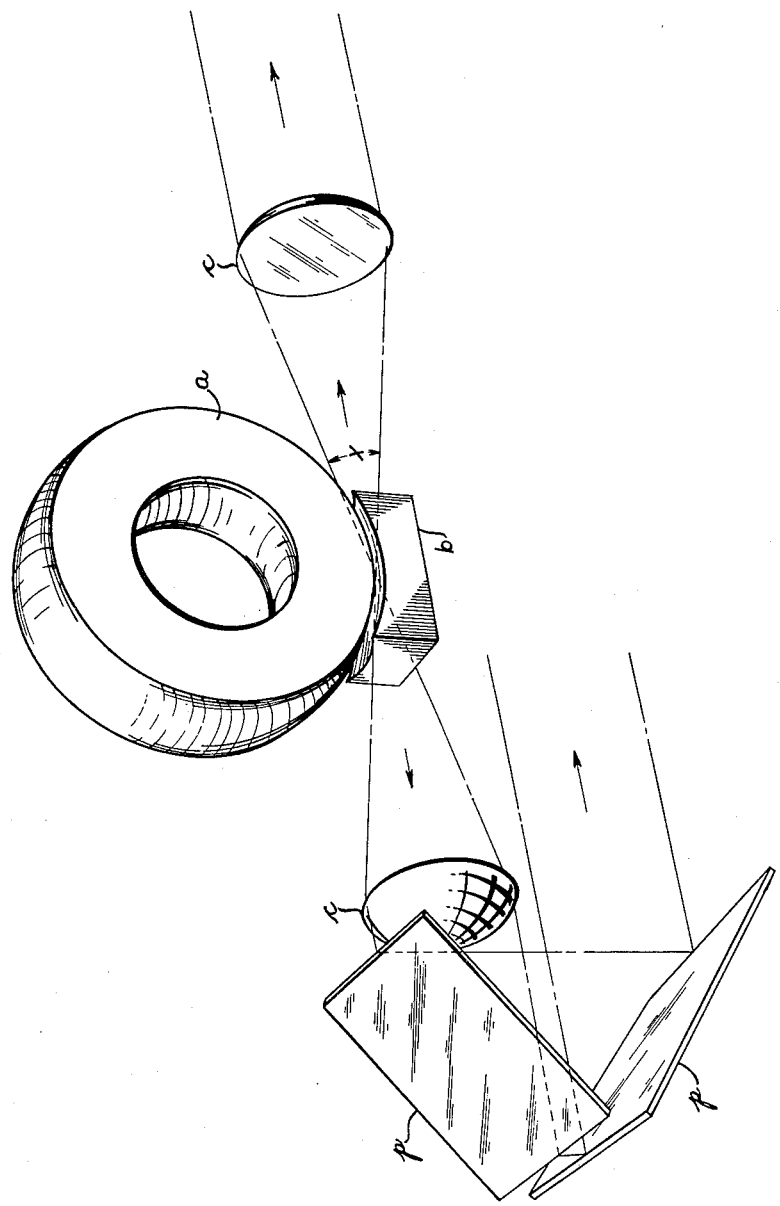
FIG. 4 is a perspective view of a further embodiment of this invention showing a more refined means of obtaining a parallel output beam.

A preferred embodiment of the cavity of this invention is shown in FIG. 3. It should be appreciated that the preferred mode of the cavity is necessarily in one singular plane. Accordingly, the preferred mode will only utilize a very thin section through the sphere. Therefore, the cavity 30 shown in FIG. 3 will be adequate to support the preferred mode and will additionally eliminate the multitude of higher order competing modes which would otherwise criss-cross the desired mode and interfere with proper mode selection. The thickness of the section is not critical in that any degree of beveling of opposing points on the sphere will provide some advantage over the entire sphere. However, as a practical value, the distance separating the flat parallel beveled surfaces, (dimension $x$ in FIG. 3) is less than two-thirds and preferably less than one-tenth of the diameter. There is no minimum dimension except that dictated by the thickness of the preferred mode propagating around the outer edge portion. FIG. 3 additionally shows pump means 31 which may be high pressure mercury arcs which provide ultra-violet pump power. The output wave front 32 is curved so that convexo-concave lens 33 is required to obtain the parallel beam 34. In order to obtain useful radiation in a desired direction, a suitably shaped piece of transparent dielectric material ($b$) may be placed in close proximity to the spherical surface ($a$) at one point, as shown in FIG. 4. The distance between $a$ and $b$ should be of the order of the wavelength of the stimulated emission. By adjusting this distance, the fractional power extracted from the sphere may be varied. As shown in FIG. 4, this radiated power has an angular spread $x$ which is proportional to the angular arc on the sphere covered by the dielectric piece $b$, and radiates in opposite directions more or less tangential to the sphere. In order to make the emerging rays parallel, collimating lenses $c$ may be employed. In order to take advantage of the power in both beams it may be desirable in some cases to redirect one of the beams by mirrors $d$ as shown. The dielectric piece $b$ may alternatively be permanently cemented to the side of the sphere. For the purpose of this description this method of extracting radiation from the cavity as well as the surface imperfections previously referred to can both be defined as discontinuities in the dielectric surface.

Since light generated within a central zone as shown in FIG. 2 is not trapped, this region is useless for maser action and may be removed, leaving the cavity 30 in the form of a hollow ring as shown in FIG. 4. Removal of this central zone lowers the requirements for pumping power.

The crystalline material constituting the cavity may be any appropriate negative temperature medium known to the art for instance, ruby or any of the materials disclosed and claimed in U.S. Patent 3,079,347 issued February 26, 1963 and copending application Serial No. 64,884 filed October 25, 1960, which are directed to crystals of calcium fluoride containing various other ions. One particular composition described therein which is appriate for this use is [.98 Ca, .01 Ce, .01 Tb]$F_2$.

The pump source may be a conventional pump such as those disclosed in the aforementioned applications which provide radiation having the appropriate frequency corresponding to that required to create a negative temperature in those negative temperature media. Also, the apparatus described in U.S. Patent 2,929,922 may be employed using the cavity of this invention in lieu of the spaced parallel planar reflectors of that device.

The size of the crystal sphere may typically vary from 3 millimeters to an inch in diameter, and its surface is preferably polished with deviations from perfection not exceeding one wavelength over the spherical surface.

While in the figures the light is considered propagated as a ray, it is apparent to those skilled in the art that the maser output when emitted from the spherical cavity will occur as a curved wave front. Thus in transmitting this signal to a desired receiver, it is usually desirable to obtain an essentially plane wave or at least a more directional wave than that emitted. Various schemes for focusing the maser output are available such as the use of convex lenses or concave paraboloidal or spherical mirrors. The prescribed use of such specific means for focusing light is well known to the art.

Various other modifications and variations of this invention will be apparent to those skilled in the art. However, such departures are considered to be within the scope of this invention.

What is claimed is:

1. An optical device for producing stimulated emission of radiation comprising a solid body of a material capable of exhibiting a negative temperature, the geometrical shape of said body consisting of at least a spherical section including a great circle dimension, and a pump source disposed around said cavity with its radiant energy incident on said negative temperature medium within the cavity, the radiation of said pump source having a frequency corresponding to the frequency required to establish a negative temperature condition within said medium, and output means coupled with said cavity to extract coherent radiation from the cavity, said output means comprising a discontinuity in the dielectric surface.

2. The maser of claim 1 wherein the said negative temperature medium is ruby.

3. The maser of claim 1 wherein the negative temperature medium comprises [.98 Ca, .01 Ce, .01 Tb]$F_2$.

4. The maser of claim 1 wherein the cavity is in the shape of a sphere.

5. The maser of claim 1 wherein the cavity comprises a section of a sphere defined by two essentially parallel planes, said planes being separated by a distance not exceeding two thirds of the diameter of said sphere.

6. The maser of claim 5 wherein said planes are separated by a distance not exceeding one tenth of the diameter of said sphere.

7. The maser of claim 5 wherein the interior portion of the section is hollow, said hollow portion defining a circular area essentially concentric with the periphery of said section.

No references cited.